(12) United States Patent
Shinomiya

(10) Patent No.: US 10,338,809 B2
(45) Date of Patent: Jul. 2, 2019

(54) PROGRAM FOR CHARACTER INPUT SYSTEM, CHARACTER INPUT DEVICE, AND INFORMATION PROCESSING DEVICE

(71) Applicant: OMRON CORPORATION, Kyoto-shi, Kyoto (JP)

(72) Inventor: Mizuho Shinomiya, Anan (JP)

(73) Assignee: OMRON CORPORATION, Kyoto-Shi, Kyoto (JP)

( * ) Notice: Subject to any disclaimer, the term of this patent is extended or adjusted under 35 U.S.C. 154(b) by 88 days.

(21) Appl. No.: 15/510,821

(22) PCT Filed: Jan. 14, 2016

(86) PCT No.: PCT/JP2016/050941
§ 371 (c)(1),
(2) Date: Mar. 13, 2017

(87) PCT Pub. No.: WO2016/129321
PCT Pub. Date: Aug. 18, 2016

(65) Prior Publication Data
US 2017/0277425 A1    Sep. 28, 2017

(30) Foreign Application Priority Data
Feb. 13, 2015  (JP) .................................. 2015-026874

(51) Int. Cl.
*G06F 3/0482* (2013.01)
*G06F 3/0488* (2013.01)
(Continued)

(52) U.S. Cl.
CPC .......... *G06F 3/04883* (2013.01); *G06F 3/023* (2013.01); *G06F 3/0236* (2013.01);
(Continued)

(58) Field of Classification Search
CPC ... G06F 3/0482; G06F 3/04883; G06F 3/0236
See application file for complete search history.

(56) References Cited

U.S. PATENT DOCUMENTS 6,271,835 B1 * 8/2001 Hoeksma ............... G06F 3/0236
345/168
6,567,072 B2 * 5/2003 Watanabe ............... G06F 3/018
345/161
(Continued)

FOREIGN PATENT DOCUMENTS

JP  2012-215944    * 11/2012  ............. G06F 3/023
JP  2012215944 A   11/2012
(Continued)

OTHER PUBLICATIONS

International Search Report dated Apr. 12, 2016 for corresponding foreign Application No. PCT/JP2016/050941, 1 pp.
(Continued)

*Primary Examiner* — Phenuel S Salomon
(74) *Attorney, Agent, or Firm* — United IP Counselors, LLC

(57) ABSTRACT

A non-transitory computer readable medium including a plurality of character types classified into two groups, and for each group, a plurality of characters assigned to each of the character keys for each group, flick input-use definition information that correlates the assigned characters to the various directions of flick input operations registered for one group, and toggle input-use definition information that correlates the assigned characters to the display order of the toggle input operation registered for the other group. The character corresponding to the direction of flick input operation is determined on the basis of the flick input-use definition information pertaining to the character key being operated, and the determined character is displayed. When a toggle input operation is performed, an assigned character
(Continued)

indicated by the toggle input-use definition information pertaining to the character key being operated is displayed by being switched in the defined order.

5 Claims, 11 Drawing Sheets

(51) Int. Cl.
  *G06F 3/023* (2006.01)
  *G06F 3/0489* (2013.01)
(52) U.S. Cl.
  CPC ........ *G06F 3/0482* (2013.01); *G06F 3/04895* (2013.01); *G06F 3/04897* (2013.01); *G06F 3/04886* (2013.01)

(56) References Cited

U.S. PATENT DOCUMENTS

| | | | | |
|---|---|---|---|---|
| 6,980,200 | B2* | 12/2005 | Goren | G06F 3/04886 |
| | | | | 345/168 |
| 7,190,351 | B1* | 3/2007 | Goren | G06F 1/1626 |
| | | | | 345/156 |
| 2001/0026274 | A1* | 10/2001 | Saruwatari | G06F 3/0236 |
| | | | | 345/467 |
| 2003/0179185 | A1* | 9/2003 | Iwamura | G06F 3/018 |
| | | | | 345/168 |
| 2009/0176532 | A1* | 7/2009 | Chae | G06F 3/0236 |
| | | | | 455/566 |
| 2009/0265669 | A1* | 10/2009 | Kida | G06F 3/0234 |
| | | | | 715/863 |
| 2010/0283736 | A1* | 11/2010 | Akabane | G06F 17/276 |
| | | | | 345/168 |
| 2012/0218178 | A1* | 8/2012 | Miyaji | G06F 3/0236 |
| | | | | 345/156 |
| 2013/0127728 | A1* | 5/2013 | Park | G06F 3/017 |
| | | | | 345/168 |
| 2014/0195959 | A1* | 7/2014 | Yoo | G06F 3/04886 |
| | | | | 715/773 |

FOREIGN PATENT DOCUMENTS

| | | | |
|---|---|---|---|
| JP | 2013145431 A | 7/2013 | |
| JP | 2013192071 A | 9/2013 | |
| JP | 2014039215 A | 2/2014 | |
| JP | 2014-238704 | * 12/2014 | ............ G06F 3/023 |
| JP | 2014238704 A | 12/2014 | |
| KR | 101359456 B1 | 2/2014 | |

OTHER PUBLICATIONS

Extended European Search Report dated Aug. 2, 2018 for corresponding European Application No. 16748966.5, 11 pp.

* cited by examiner

FIG. 2

| Key | Representative character | Assigned character during flick input | | | | Assigned character during toggle input | | | | |
|---|---|---|---|---|---|---|---|---|---|---|
| | | Left | Up | Right | Down | (1) | (2) | (3) | (4) | (5) |
| あ | あ | い | う | え | お | 1 | . | @ | — | |
| か | か | き | く | け | こ | 2 | / | : | — | |
| さ | さ | し | す | せ | そ | 3 | ~ | % | 〈 | |
| た | た | ち | つ | て | と | 4 | 「 | 、 | ・ | 」 |
| な | な | に | ぬ | ね | の | 5 | ∨ | $ | ＊ | 〉 |
| は | は | ひ | ふ | へ | ほ | 6 | — | & | ： | 「 |
| ま | ま | み | む | め | も | 7 | / | — | | |
| や | や | | ゆ | | よ | 8 | ⌣ | ) | | |
| ら | ら | り | る | れ | ろ | 9 | = | : | ? | |
| わ | わ | を | ん | — | | 0 | - | + | . | |
| 、 | 、 | 。 | | | | # | . | ＊ | | |

| Key | Representative character | Assigned character during flick input | | | | Assigned character during toggle input | | | | | | | | |
|---|---|---|---|---|---|---|---|---|---|---|---|---|---|---|
| | | Left | Up | Right | Down | (1) | (2) | (3) | (4) | (5) | (6) | (7) | (8) | (9) |
| あ | あ | . | @ | – | 1 | い | う | え | お | あ | い | う | え | お |
| か | か | 〝 | : | – | 2 | き | く | け | こ | か | | | | |
| さ | さ | ～ | % | 〈 | 3 | し | す | せ | そ | さ | | | | |
| た | た | [ | " | ] | 4 | ち | つ | て | と | た | っ | | | |
| な | な | 〈 | $ | 〉 | 5 | に | ぬ | ね | の | な | | | | |
| は | は | 「 | & | 」 | 6 | ひ | ふ | へ | ほ | | | | | |
| ま | ま | , | · | * | 7 | み | む | め | も | | | | | |
| や | や | 〜 | ・ | ( | 8 | ゆ | よ | や | ゅ | | | | | |
| ら | ら | / | ＋ | = | 9 | り | る | れ | ろ | | | | | |
| わ | わ | ； | – | ？ | 0 | を | ん | わ | ー | | | | | |
| 。 | 、 | ． | ＊ | ・ | ＃ | 。 | | | | | | | | |

FIG. 4

|  | Representative character | Assigned character during flick input | | | | Assigned character during toggle input | | | | |
|---|---|---|---|---|---|---|---|---|---|---|
| Key | | Left | Up | Right | Down | (1) | (2) | (3) | (4) | (5) |
| @/:~ | @ | / | : | ~ | 1 | & | — | * | $ | |
| abc | a | b | c | | 2 | A | B | C | / | |
| def | d | e | f | | 3 | D | E | F | ~ | |
| ghi | g | h | i | | 4 | G | H | I | : | |
| jkl | j | k | l | | 5 | J | K | L | [ | ] |
| mno | m | n | o | | 6 | M | N | O | < | " |
| pqrs | p | q | r | s | 7 | P | Q | R | S | ' |
| tuv | t | u | v | | 8 | T | U | V | ( | ) |
| wxyz | w | x | y | z | 9 | W | X | Y | Z | |
| -_ | - | _ | , | . | 0 | < | ^ | - | - | |
| .,?! | . | , | ? | ! | | % | + | * | = | |

PROGRAM FOR CHARACTER INPUT SYSTEM, CHARACTER INPUT DEVICE, AND INFORMATION PROCESSING DEVICE

CROSS-REFERENCE TO RELATED APPLICATIONS

This application is the U.S. National Phase of PCT International Application No. PCT/JP2016/050941, filed on Jan. 14, 2016. That application claims priority to Japanese Patent Application No. 2015-026874, filed Feb. 13, 2015. The contents of both applications are herein incorporated by reference in their entirety.

BACKGROUND

Technical Field

The present invention relates to a program for giving a computer the function of setting an input character display area and a keyboard image for character input on a touch screen, selecting input characters according to operation of character keys in the keyboard image, and displaying the selected input characters in the input character display area, as well as to an information processing device and a character input device run by a computer on which this program has been loaded.

Description of the Related Art

With a compact information processing device equipped with a touch screen, such as a smart phone, when an input character display area and a keyboard image in which are arranged a plurality of character keys to which a plurality of characters have been assigned are set on a touch screen, the input of characters is received according to a flick input operation or a toggle input operation of the character keys. A flick input operation involves touching a character key and then lightly sliding the touching finger in a specific direction. Depending on the direction of this slide, one of a plurality of characters is selected as an input character, and it is displayed in the input character display area (see FIG. 14 in Japanese Laid-Open Patent Application 2013-192071, for example). A toggle input operation involves continuously tapping the same character key. The characters assigned to the character key being operated are switched each time the key is tapped. If a place other than the key tapped the last time on the touch screen is touched, it is concluded that the toggle input operation has ended, and the character selected by the final tap of the toggle input operation is confirmed as the input character (see FIG. 13 in Japanese Laid-Open Patent Application 2013-192071, for example).

Many information processing devices aimed at Japanese users are configured to accommodate both flick input operation and toggle input operation. Furthermore, a plurality of types of keyboard image are registered in order to make possible the input of a plurality of types of character, and the display of the keyboard image is switched according to the switching of the character type to be inputted (see FIGS. 1, 2, and 14 in Japanese Laid-Open Patent Application 2013-192071, for example).

SUMMARY

A problem with a method in which the keyboard image is switched every time the type of character to be inputted is changed is that the operation becomes complicated and is inconvenient. For example, with an information processing device aimed at Japanese users, since a kana input keyboard image is usually displayed, when numerals representing a date, time, or the like are to be inputted, the user has to switch to the alphanumeric input keyboard image, and then once that input is finished, has to go back to the display of the kana input keyboard image. Similarly, when symbols are inputted, the user has to switch from the kana input keyboard image to a list of various symbols, and after selecting the necessary symbol, has to go back to the display of the kana input keyboard image. As the frequency of inputting character types other than kana increases, so too does the frequency of switching the keyboard image, which makes the character input operation extremely complicated and reduces input efficiency.

The present invention focuses on the above problem, and it is an object thereof to improve the ease of use and convenience of character input by switching the type of character to be inputted depending on the input operation mode, rather than switching the keyboard image, for a plurality of types of character.

A computer loaded with the program of the present invention functions as a character input device that includes an input screen setting means for setting on a touch screen an input character display area and a keyboard image including a plurality of character keys to which a plurality of characters are assigned; and a character input reception means for executing flick input reception processing in which one of a plurality of characters assigned to a touched character key is displayed in the input character display area as an input character in response to a flick input operation in which a touch is canceled after a touch position has been slid in a specific direction while one of the character keys in the keyboard image is still being touched, and toggle input reception processing in which the plurality of characters assigned to a character key are displayed one at a time in a specific order in the input character display area in response to a toggle input operation in which the same character key in a keyboard image is continuously tapped, and the character displayed at the end of said toggle input operation is confirmed as the input character.

The character input device includes a definition information registration means with which a plurality of character types are divided into a first group and a second group, a plurality of characters are assigned to each of the plurality of character keys for each group, flick input-use definition information that indicates, for each of the plurality of character keys, the correlation between the characters assigned to said character keys and the direction of flick input operation pertaining to each character is registered for one group, and toggle input-use definition information that correlates the plurality of characters assigned to said character keys to the display order when these characters are displayed in order according to the toggle input operation is registered for the other group. Also, in response to the flick input operation, the character input reception means determines the character corresponding to the direction of the flick input operation on the basis of the flick input-use definition information pertaining to the character key that was operated, and displays the determined character in the input character display area, but in response to a toggle input operation, while this operation is being performed, the character input reception means switches the display of the character in the input character display area on the basis of the toggle input-use definition information pertaining to the character key that is operated.

With a character input device configured as above, the type of character to be inputted can be switched by executing either a flick input operation or a toggle input operation, rather than switching the keyboard image. Also, the character type with the highest frequency of use is assigned to the first group, while other character types are assigned to the second group, and if definition information corresponding to the operation most familiar to the user (either flick input operation or toggle input operation) is applied to the first group, then the user can input the primary character type by the familiar operation, and a less familiar operation need be performed only when it is necessary to input characters of another type, so there is no risk that ease of use will be compromised. Depending on the number of character keys and the number of characters in each group, it is conceivable that in certain exceptional situations the keyboard image may include a character key to which are assigned only characters from either the first group or the second group. For an exceptional character key such as this, flick input-use definition information aimed at just some of the assigned characters and toggle input-use definition information aimed at the remaining characters can be registered in the definition information registration means.

With the definition information registration means in an embodiment of the above-mentioned character input device, a plurality of types of character are classified into a first group that includes only a particularly type of character (such as kana), and all the other types of character (such as one or more of numerals, Roman letters, and symbols). This classification makes a clear distinction between an input operation for inputting the primary character type, and an input operation for inputting other character types, so the user can readily grasp the input method.

With the definition information registration means pertaining to another embodiment, a number of characters corresponding to the number of character keys (out of the characters assigned to the character type of the first group) are assigned as representative characters for each character key in the keyboard image, and the definition information for each character key includes information that defines the display of representative characters according to the first tap of the relevant character key. The "first tap of the character key" includes not only when that character key is tapped for the first time, but also the first tap operation of that character key after a different character key was operated immediately prior to this. With this definition information, a representative character can be inputted by a single tap of the character key to which the representative character is assigned.

With the definition information registration means pertaining to another embodiment, the definition information registration means includes a first information group composed of flick input-use definition information in which the assigned characters are characters of the first group and toggle input-use definition information in which the assigned characters are characters of the second group, and a second information group composed of toggle input-use definition information in which the assigned characters are characters of the first group and flick input-use definition information in which the assigned characters are characters of the second group. Furthermore, a definition information activation means is provided for receiving an operation to select whether the input of characters of the character type in the first group is done by flick input operation or by toggle input operation, activating the first information group of the definition information registration means if flick input operation has been selected, and activating the second information group of the definition information registration means if toggle input operation has been selected.

The above embodiment can be such that the character type of the highest usage frequency is included in the first group, and the first and second information groups are registered ahead of time, allowing characters of the first group to be inputted by the selected input method according to the user's selection of an input method. Thus, if the user should prefer either flick input operation or toggle input operation, an input environment can be provided to match that preference.

The present invention also provides an information processing device of various forms includes a touch screen and the above-mentioned character input device.

With the present invention, the character type to be inputted can be changed according to whether flick operation or toggle operation is executed, without having to switch the keyboard image. This allows the work of inputting characters to be accomplished more efficiently, and makes the device easier and more convenient to use.

BRIEF DESCRIPTION OF DRAWINGS

FIG. 2 is a diagram illustrating the configuration of a first assigned character definition table.

FIG. 3 is a diagram illustrating the configuration of a second assigned character definition table.

FIG. 4 is a diagram illustrating the configuration of a third assigned character definition table.

DETAILED DESCRIPTION

Figure 1:
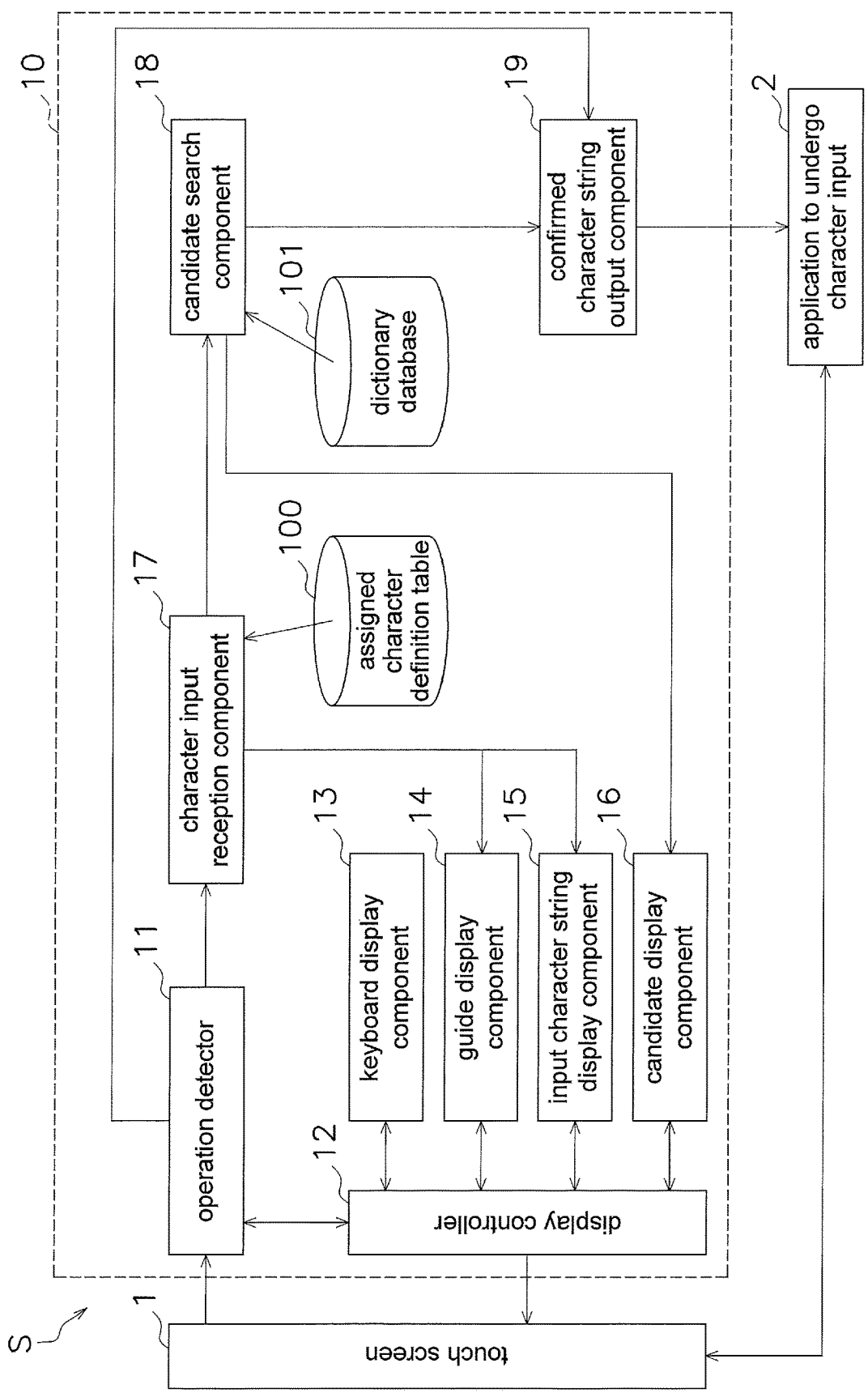
FIG. 1 is a function block diagram of the configuration of a character input system to which the present invention is applied.

FIG. 1 shows the functions of a character input system (IME) 10 loaded into a smart phone S, along with their relation to a touch screen 1 provided on the front of the smart phone S or the application 2 that is to undergo character input (such as an Internet browser, a mailer, or a notepad). The character input system 10 and the display component 2 are both software incorporated into the computer inside the smart phone, and operate under the control of an operating system (not shown).

The character input system 10 in this example includes an operation detector 11, a display controller 12, a keyboard display component 13, a guide display component 14, an input character string display component 15, a candidate display component 16, a character input reception component 17, a candidate search component 18, a confirmed character string output component 19, an assigned character definition table 100, a dictionary database 101, and so forth.

Of the above components, the assigned character definition table 100 and the dictionary database 101 are memory means in which information produced by the system developers is registered. For each individual character key 30 in a keyboard image 3 (discussed below), a plurality of characters assigned to that character key 30 and definition information for inputting the various characters are registered in the assigned character definition table 100 (this will be discussed in detail below). A plurality of sets of dictionary data configured so that vocabulary or notation character strings indicating commonly used phrases are associated with the pronunciations of the characters, their priority, and so on are registered in the dictionary database 101.

When a touch operation for character input is detected on the execution screen of the application 2, joint processing by the display controller 12 and the keyboard display component 13 causes a character input screen (see FIGS. 5 to 8) including the keyboard image 3 and the input character display area 4 to be launched on the touch screen 1. After this, the character input reception component 17 or the candidate search component 18 is actuated on the basis of the type of operation detected by the operation detector 11, and various changes are made to the display in the character input screen by the joint processing of the guide display component 14, the input character string display component 15, and the candidate display component 16 along with the display controller 12 in response to this actuation. Using the reference symbols shown in FIGS. 5 to 8, the various guide images GF1, GF2, and GT for assisting in character input work are displayed by joint processing by the guide display component 14 and the display controller 12. The input characters related to the operation of the individual character keys 30 are displayed in the input character display area 4 by the joint processing of the input character string display component 15 and the display controller 12, and this is repeated until an input character string of a specific length is displayed. Also, a candidate display area 5, which shows candidates for input character strings in the final form extracted by the candidate search component 18, is displayed by joint processing between the candidate display component 16 and the display controller 12.

From the operating system, the operation detector 11 inputs the coordinates of representative points in the region where contact by a finger on the touch screen 1 was detected (hereinafter referred to as "touch points"), and various operation events related to character input (hereinafter referred to as "touch events") are detected from changes in the inputted coordinates or changes in whether there is input or not. For instance, a change from a state in which the coordinates of the touch points have not been inputted to a state in which they have been inputted is detected as an action of placing a finger at the position indicated by a touch point (hereinafter referred to as a "touch"). A change from a state in which the coordinates of the touch points have been inputted to a state in which they have not been inputted is detected as an action of moving the finger away from the touch screen at the position where this change occurred (hereinafter referred to as a "lift-up").

The operation detector 11 compares the coordinates of the touch point just prior to lift-up to the coordinates of the touch point at the touch detected before that, and determines whether a slide operation or a tap operation has been performed. In particular, a slide operation that occurs starting at the coordinates of a specific character key 30 within the keyboard image 3 is determined to be a flick input operation, and a continuous tap operation on the same character key is determined to be a toggle input operation.

The character input reception component 17 starts processing for a character key 30 in response to the detection by the operation detector 11 of the first touch of that character key 30 that is different from the one last operated. In this processing, definition information registered to the assigned character definition table 100 in relation to the touched character key 30 is referred to while the input character according to the input operation after the touch is selected. The selected input character is displayed by the input character string display component 15 in the input character display area 4. In conjunction with this display, the candidate search component 18 searches the dictionary database 101 and extracts candidate character strings corresponding to an input character or to combinations of characters inputted so far. When the operation detector 11 receives an operation to select a candidate character string within the candidate display area 5 or an input character string, the confirmed character string output component 19 is actuated and the selected character string is outputted to the application 2.

FIGS. 2 to 4 show examples of definition information registered to the assigned character definition table 100. In these drawings, the various assigned character definition tables are distinguished by referring to them by the numbers 100A, 100B, and 100C. From here on, when the assigned character definition tables are mentioned individually, the table in FIG. 2 will be called the first assigned character definition table 100A, the table in FIG. 3 the second assigned character definition table 100B, and the table in FIG. 4 the third assigned character definition table 100C.

The assigned characters for the 10 character keys 30 and sub-character keys 32 shown in FIGS. 5 to 8 are divided into representative characters, assigned characters during flick input, and assigned characters during toggle operation, and are registered to the assigned character definition tables 100A, 100B, and 100C. The assigned characters during flick input are associated with the direction (left, up, right, down) of the flick operation, while the assigned characters during toggle input are associated with a numerical value expressing the order of display (in FIGS. 2 to 4, these are the numerals in parentheses, such as (1) and (2)). As will be discussed below, from a control standpoint flick input mode is the default, and for the sake of convenient input, the representative character is selected when the flick input mode is both on and off. The columns with slash marks in the assigned character definition tables 100A, 100B, and 100C mean that there is no assigned character.

With a conventional character input system, characters were assigned to both flick input operation and toggle input operation, but with the first to third assigned character definition tables 100A, 100B, and 100C, the assigned characters during flick input and the assigned characters during toggle input are in mutually different states.

FIGS. 5 to 8 show examples of the transition in the character input screen when a character input operation is received using one of the assigned character definition tables 100A, 100B, and 100C. As seen in the front view of the smart phone S in these drawings, the keyboard image 3 including 10 character keys 30, to each of which is assigned one number from 0 to 9, is displayed on the character input screen. In addition to these 10 character keys 30, sub-character keys 31 and 32, which have functions pertaining to the production of input character strings, are provided to the left and right of the middle character key 30 in the bottom row (the key to which the number "0" is assigned).

Figure 5:
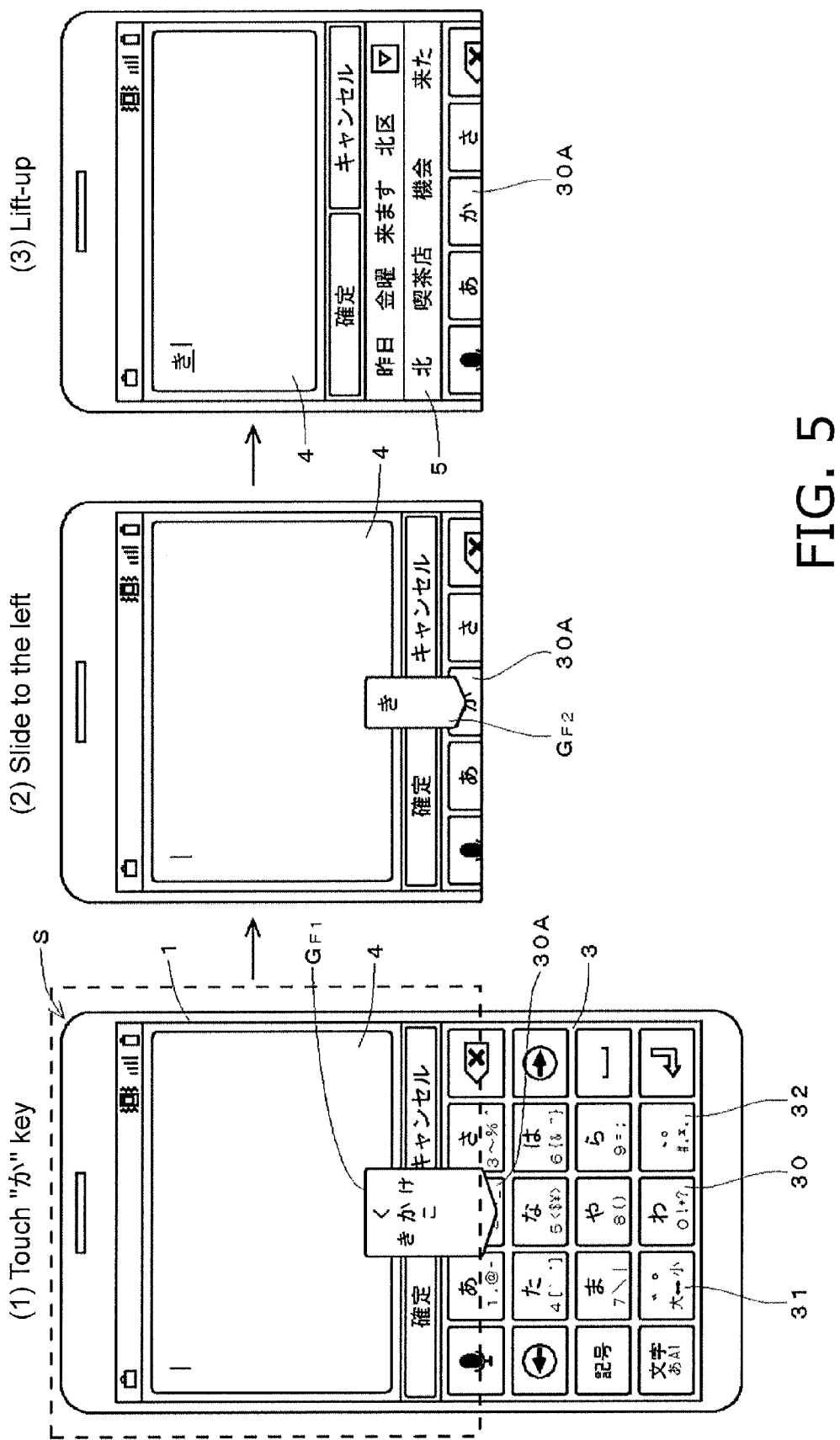
FIG. 5 is a diagram showing an example of the transition in the character input screen when a flick input operation has been received, on the basis of definition information from the first assigned character definition table.
Figure 6:
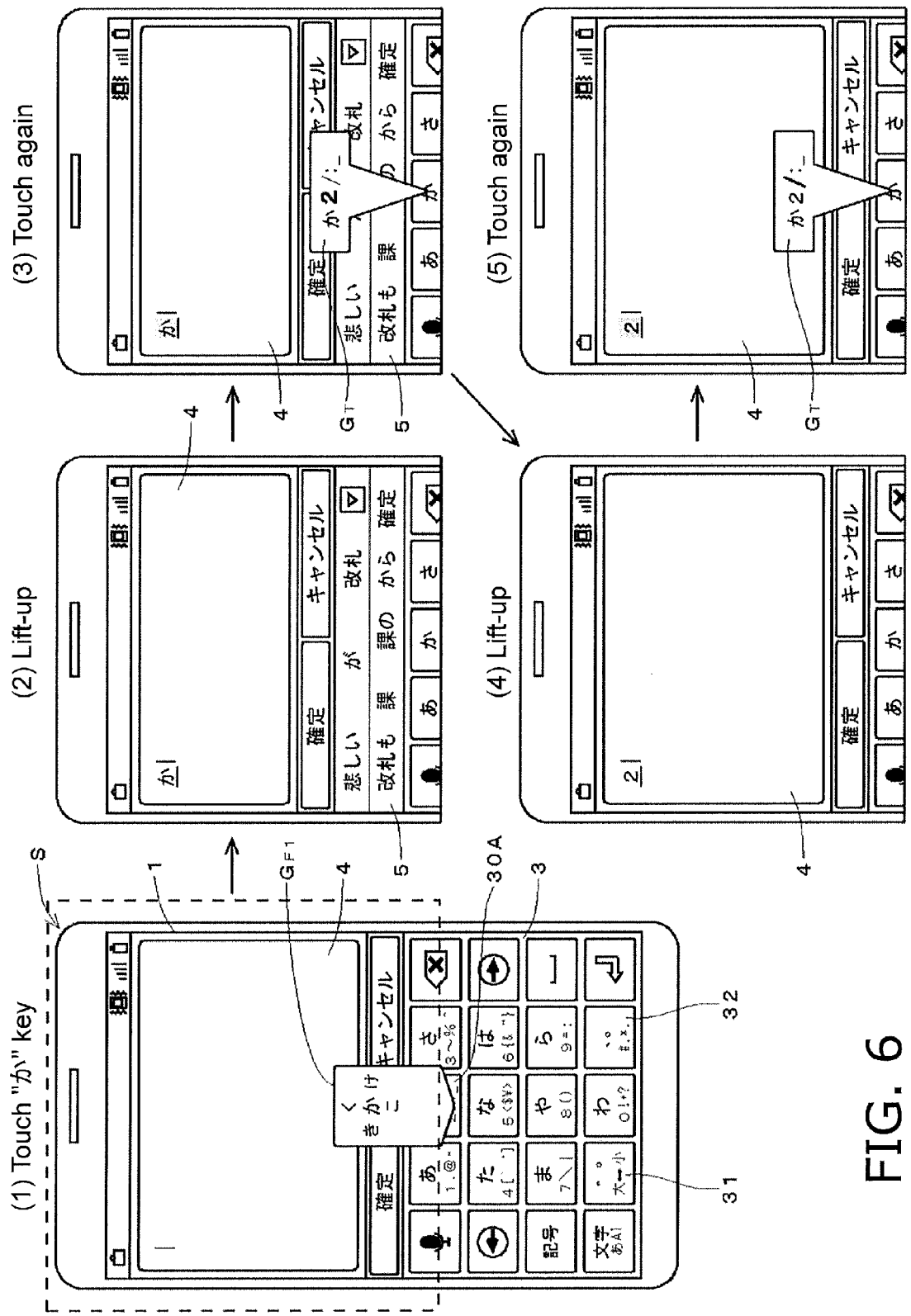
FIG. 6 is a diagram showing an example of the transition in the character input screen when a toggle input operation has been received, on the basis of definition information from the first assigned character definition table.
Figure 7:
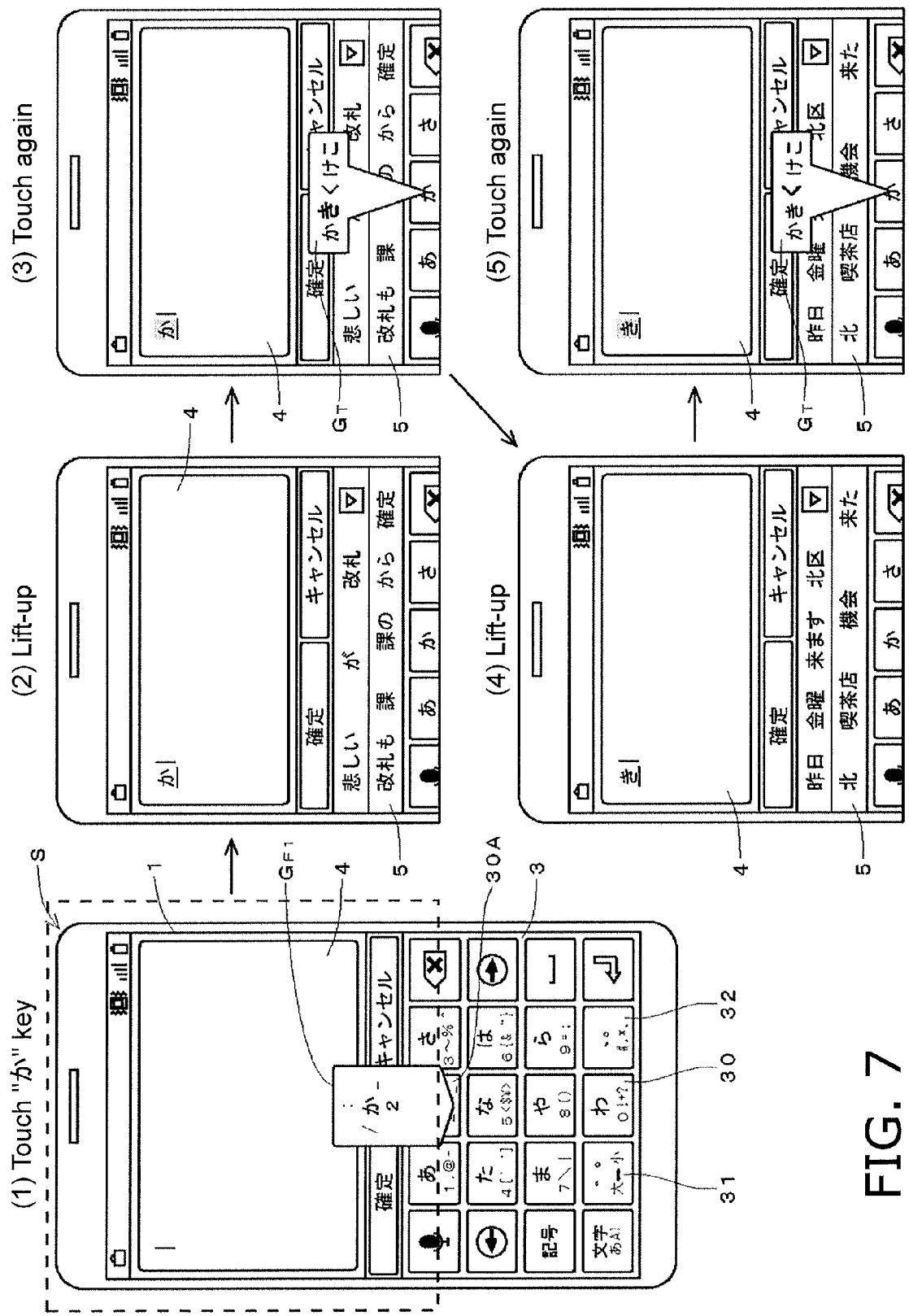
FIG. 7 is a diagram showing an example of the transition in the character input screen when a toggle input operation has been received, on the basis of definition information from the second assigned character definition table.

With the keyboard image 3 used for Japanese input in the various examples in FIGS. 5 to 7, a plurality of symbols are assigned in addition to the various rows of the Japanese syllabary table being assigned one column to each key. A function of adding diacritical marks to the preceding input character, or the function of converting a kana character into a small character when a kana character is inputted by flick input operation immediately before, is assigned to the sub-character key 31. Punctuation marks and a plurality of symbols are assigned to the sub-character key 32.

Figure 8:
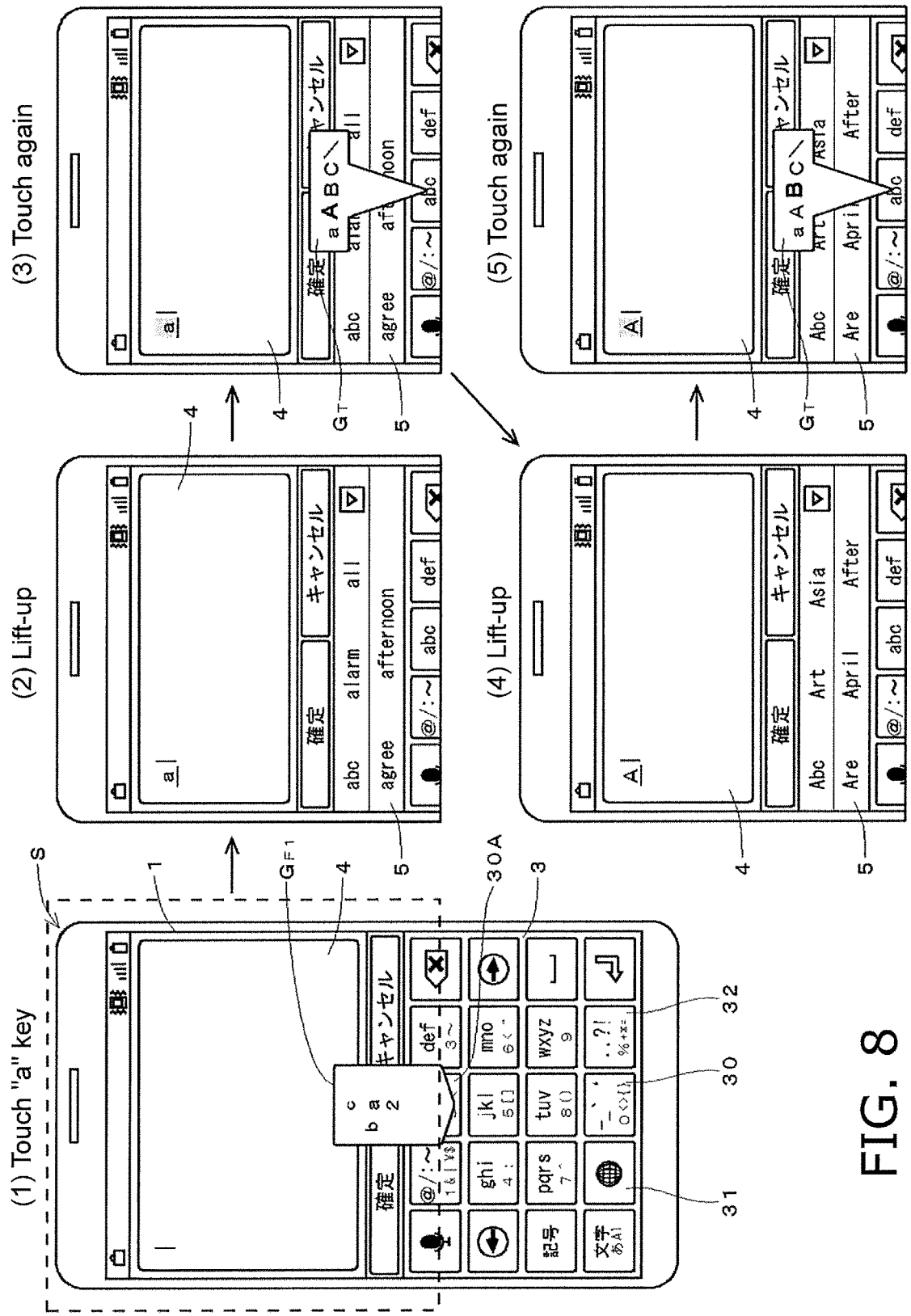
FIG. 8 is a diagram showing an example of the transition in the character input screen when a toggle input operation has been received, on the basis of definition information from the third assigned character definition table.

With the alphanumeric input-use keyboard image 3 shown in FIG. 8, three or four Roman letters are assigned to each of the eight character keys 30 to which the numerals 2 to 9 were assigned. More symbols than on the other character keys 30 are assigned to the remaining two character keys 30 (the keys to which the numerals 0 and 1 were assigned) and the sub-character key 32 on the right side. In this example, a function of calling up a list of special characters, such as emoji, is set to the sub-character key 31.

In FIGS. 5 to 8, the key located in the middle of the upper row of the 10 character keys 30 (the key to which the numeral 2 is assigned) is labeled 30A, and the transition in the character input screen according to flick input operation or toggle input operation for this character key 30A is shown. Specific examples of these will be described below along with the configuration of the assigned character definition tables 100A, 100B, and 100C used in the various examples.

With the first assigned character definition table 100A shown in FIG. 2, four kana characters (excluding the representative characters) are given as assigned characters during flick input operation, while numerals and symbols are given as assigned characters during toggle input operation. FIG. 5 shows the transition in the character input screen when a flick input operation has been received to slide the touch point to the left after a touch has been detected on the character key 30A in the "か" row, on the basis of this first assigned character definition table 100A.

In this example, first, when a touch to the character key 30A is detected, a first guide image GF1 is displayed that includes the four characters "き," "く," "け," and "こ" that can be inputted by flick input, on the basis of definition information during flick input registered to the first assigned character definition table 100A in relation to the character key 30A (FIG. 5 (1)). The first guide image GF1 in this example has the representative character "か" in the center, and the other four characters are disposed facing in the directions defined by the first assigned character definition table 100A with respect to "か," thereby indicating the directions of the slide operation required to input the four characters.

Then, when movement of the touch point that accompanies a slide in a specific direction (to the left in the depicted example) is detected, the first guide image GF1 switches to a second guide image GF2 that includes only the character "き" corresponding to that slide direction (FIG. 5 (2)). When lift-up is detected, the second guide image GF2 disappears, and the character "き" corresponding to the slide direction is displayed in the input character display area 4 (FIG. 5 (3)).

FIG. 6 shows the transition in the character input screen when a toggle input operation has been received for the character key 30A, on the basis of definition information during toggle input in the first assigned character definition table 100A. Here again, when a touch has been detected on the character key 30A, the first guide image GF1 used for flick input (configured the same as in FIG. 5 (1)) is displayed (FIG. 6 (1)). However, if lift-up is detected at substantially the same location as the point where the touch was detected as a result of the first lift-up from the character key 30A, the first guide image GF1 disappears and the representative character "か" is displayed in the input character display area 4 (FIG. 6 (2)).

If another touch is detected at the character key 30A after this, the toggle input-use guide image GT is displayed (FIG. 6 (3)). This guide image GT is configured such that assigned characters during toggle input registered to the first assigned character definition table 100A in relation to the character key 30A are arranged in the defined display order, and the character "2" for which the display order is set to (1) is highlighted in the display.

After this, if another touch is detected at substantially the same location as the touch detection point, the guide image GT disappears and the character in the input character display area 4 is switched from "か" to "2" (FIG. 6 (4)). Further, if a third touch is detected within the character key 30A, the toggle input-use guide image GT is again displayed. With the guide image GT at this point, the symbol "/" for which the display order is set to (2) in the definition information during toggle input in the first assigned character definition table 100A is highlighted in the display (FIG. 6 (5)). Although not depicted in the drawings, when a lift-up from the character key 30A is detected in the state in FIG. 6 (5), the character in the input character display area 4 is switched from "2" to "/."

Similarly, while a state continues in which a touch to the character key 30A and lift-up from a location that is substantially the same as the touch point are alternately detected, the toggle input-use assigned characters registered to the first assigned character definition table 100A are switched at each lift-up according to the display order, and are displayed in the input character display area 4. Also, for every touch, the guide image GT is displayed, in which the character switched to during lift-up is highlighted in the display. If a touch within the character key 30A is detected even though the last character has been displayed, the representative character "か" is displayed again, but at this point it is impossible to switch to flick input operation.

Regarding the other character keys 30 besides the character key 30A and the sub-character key 32, just as in the example in FIGS. 5 and 6, the type of input character selected varies with the type of input operation that is executed. According to the first assigned character definition table 100A, the kana characters that are the primary input objects are all assigned to one of the character keys 30 as the assigned character during flick input, so the user may perform the input of kana characters by flick input operation, while performing toggle input operation only when it is necessary to input numerals or symbols. Thus, three types of character, namely, kana characters, numerals, and symbols, can be inputted without having to switch the keyboard image 3.

The second assigned character definition table 100B shown in FIG. 3 is configured such that numerals and symbols are assigned characters during flick input, while kana characters are the assigned characters during toggle input. With the second assigned character definition table 100B, small kana are included in the assigned characters during toggle input of the character keys to which are assigned kana that can be converted to small characters.

FIG. 7 shows the transition in the character input screen when a toggle input operation is received on the character key 30A of the "か" row, on the basis of the second assigned character definition table 100B. Again in this example, the flick input-use first guide image GF1 is displayed in response to the first touch of the character key 30A, but the first guide image GF1 in this case is configured such that numerals or symbols defined as the assigned characters during flick input in the second assigned character definition table 100B are disposed with the representative character "か" in the center (FIG. 7 (1)).

If a lift-up is detected at substantially the same location as the touch detection point, the first guide image GF1 disappears, and the representative character "か" is displayed in the input character display area 4 (FIG. 7 (2)). If another touch is detected within the character key 30A, the toggle input-use guide image GT, in which the kana characters of the "か" row are arranged, is displayed on the basis of the definition information for the character key 30A registered to the second assigned character definition table 100B. With the guide image GT at this stage, "き" for which the display order is set to (1) among the assigned characters during toggle input of the character key 30A is highlighted in the display (FIG. 7 (3)).

If a lift-up is detected at substantially the same location as the immediately prior touch detection point, the display of the input character display area 4 is switched from "か" to "き" (FIG. 7 (4)). If another touch is then detected within the character key 30A, the toggle input-use guide image GT is again displayed, but with the guide image GT at this stage, "く" for which the display order is set to (2) in the second assigned character definition table 100B is highlighted in the display (FIG. 7 (5)).

The same applies thereafter; while a state continues in which a touch to the character key 30A and lift-up from a location that is substantially the same as the touch point are alternately detected, "き," "く," "け," "こ," and the representative character "か" registered as toggle input-use assigned characters in the second assigned character definition table 100B are displayed in the input character display area 4 according to the display order, being switched every time there is a lift-up. Also, for every touch, the guide image GT is displayed, in which the next character switched to is highlighted in the display.

A specific example of when flick input operation is performed for the above-mentioned character key 30A using the second assigned character definition table 100B will now be described briefly, although not depicted in the drawings. In this case, after a touch has resulted in a move to the display state shown in FIG. 7 (1), the symbol or numeral corresponding to the slide direction is selected in response to the lift-up after the slide operation, and this is displayed in the input character display area 4. For example, if a lift-up is detected after the touch point has moved to the left following a touch within the character key 30A, a "/" associated with "left" is displayed in the input character display area 4, out of the assigned characters during toggle input for the character key 30A of the second assigned character definition table 100B.

With character input reception processing using the second assigned character definition table 100B, the user inputs a kana character (the primary input object) by toggle input operation, and performs flick input operation only when it is necessary to input numerals or symbols, so three types of character, namely, kana characters, numerals, and symbols, can be inputted without having to switch the keyboard image 3.

With the third assigned character definition table 100C shown in FIG. 4, the character in the front position out of the three or four lower-case Roman letters is assigned to each of the eight character keys 30 to which 2 to 9 were assigned, and the remaining lower-case letters and numerals are registered as assigned characters during flick input. Upper case Roman letters and a specific number of symbols are registered as assigned characters during toggle input. With the "0" and "1" character keys 30 and the sub-character key 32 to which no Roman letters are assigned, the assigned characters during flick input and the assigned characters during toggle input are different from each other.

FIG. 8 shows the transition in the character input screen when a toggle input operation has been received for the character key 30A, in which "a" is the representative character, on the basis of the third assigned character definition table 100C. In this example, the first guide image GF1 displayed in response to the first touch of the character key 30A is configured such that "b," "c," and "2" that are registered as assigned characters during flick input of the character key 30 are disposed in the third assigned character definition table 100C, with the representative character "a" in the center, according to the directions defined for each one (FIG. 8 (1)). When a lift-up is then detected at substantially the same location as the touch detection point, the first guide image GF1 disappears, and "a" is displayed in the input character display area 4 (FIG. 8 (2)).

When another touch is detected within the character key 30A, the toggle input-use guide image GT is displayed. The guide image GT in this example is configured such that the upper-case letters "A," "B," and "C" and the symbol "/" that are registered as assigned characters during toggle input for the character key 30A in the third assigned character definition table 100C are added to the representative character "a" in the defined order, and the "A" for which the display order is set to (1) in the definition information during toggle input is highlighted in the display (FIG. 8 (3)).

When another lift-up is detected at the character key 30A, the display in the input character display area 4 is switched from "a" to "A" (FIG. 8 (4)). When another touch is then detected within the character key 30A, the toggle input-use guide image GT is again displayed, but with the guide image GT at this stage, the "B" for which the display order is set to (2) in the definition information during toggle input is highlighted in the display (FIG. 8 (5)).

The same applies thereafter; while a state continues in which a touch to the character key 30A and lift-up from a location that is substantially the same as the touch point are alternately detected, the four characters and the representative character "a" registered as assigned characters during toggle input in the third assigned character definition table 100C are displayed in the input character display area 4 according to the display order, being switched every time there is a lift-up. Also, for every touch, the guide image GT is displayed, in which the next character switched to is highlighted in the display.

A case in which flick input operation is performed for the above-mentioned character key 30A on the basis of the third assigned character definition table 100C will now be described briefly, although not depicted in the drawings. In this case, after a touch has resulted in a move to the display state shown in FIG. 8 (1), the lower-case letter or numeral corresponding to the slide direction is selected in response to the lift-up after the slide operation, and this is displayed in the input character display area 4. For example, if a lift-up is detected after the touch point has moved to the left following a touch within the character key 30A, a "b" associated with "left" is displayed in the input character display area 4, out of the assigned characters during flick input registered in the third assigned character definition table 100C in relation to the character key 30A.

Thus, with character input reception processing using the third assigned character definition table 100C, the user inputs a lower-case letters and numerals, which are inputted the most frequently, by flick input operation, and performs toggle input operation only when it is necessary to input upper-case letters or symbols. This means that four types of character, namely, upper- and lower-case letters, numerals, and symbols, can be inputted without having to switch the keyboard image 3.

The input of alphanumeric characters is the opposite of what is shown in FIG. 4, and instead lower-case letters and numerals may become the assigned characters during toggle input, and upper-case letters and symbols may become the assigned characters during flick input, and an assigned character definition table of this configuration may be provided. With this assigned character definition table 100, the lower-case letters and numerals are inputted by toggle input operation, while flick input operation is performed only when it is necessary to input upper-case letters and symbols.

To improve convenience in actual character input, the various kinds of assigned character definition table 100 listed above should be registered ahead of time, and the user should select whether flick input operation or toggle input operation should be the primary operation, and activate an assigned character definition table 100 which is configured such that characters with the highest input frequency are assigned to the selected input operation. For example, for Japanese kana input, if flick input operation has been selected, the first assigned character definition table 100A should be activated, and if toggle input operation has been selected, the second assigned character definition table 100B should be activated.

Figure 9:
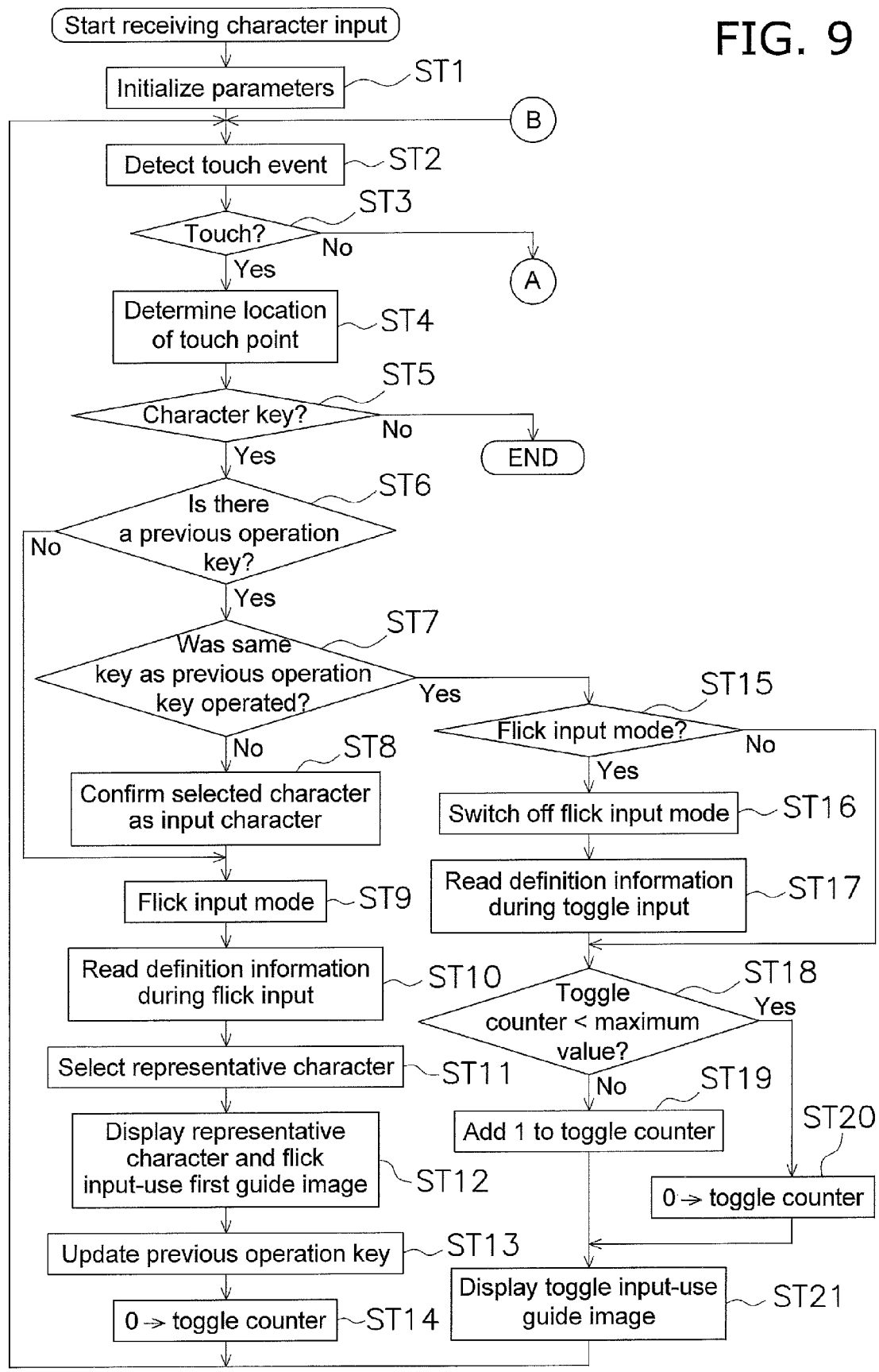
FIG. 9 is a flowchart showing the flow of input reception processing.
Figure 10:
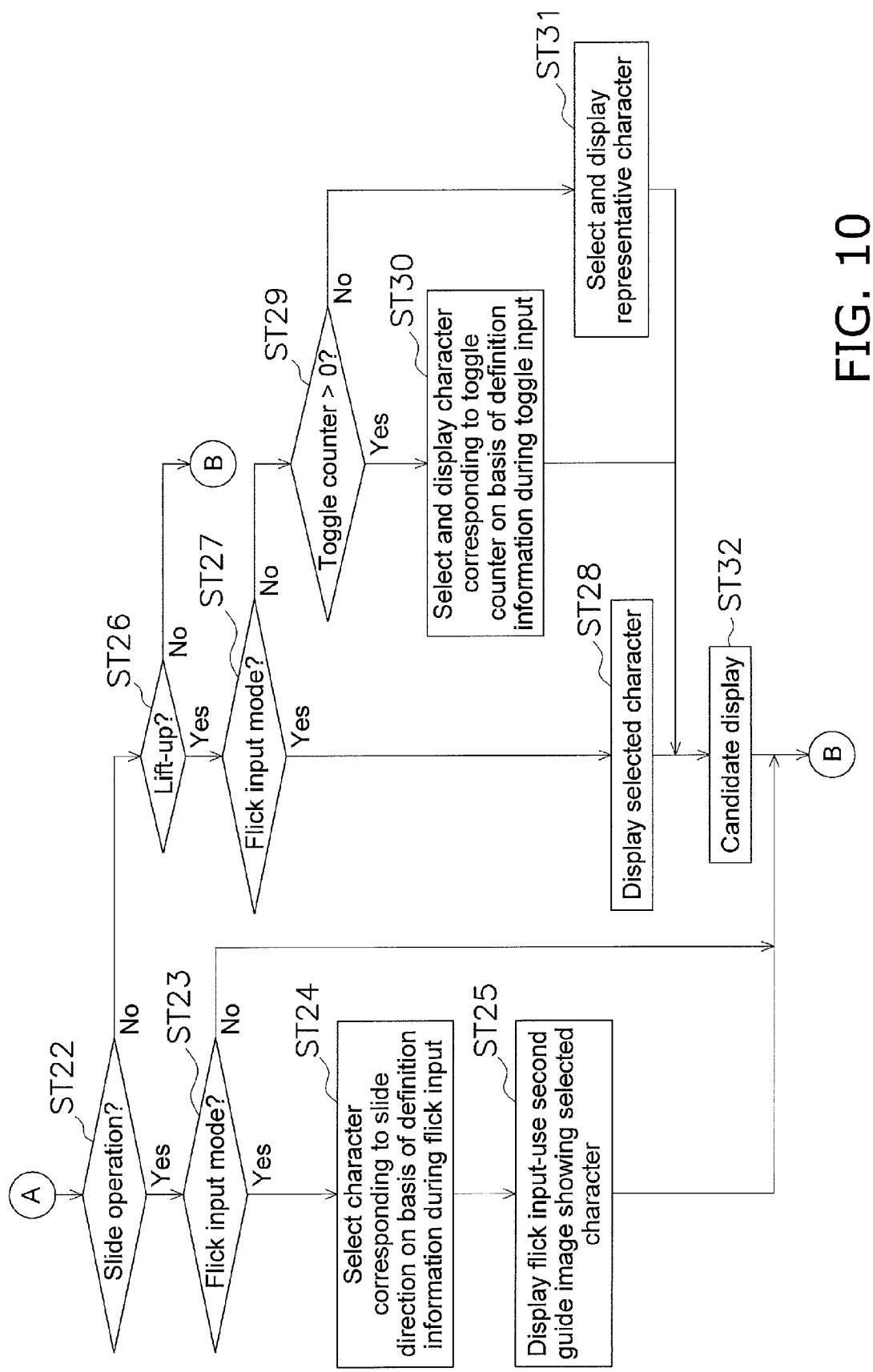
FIG. 10 is a flowchart showing the flow of processing continuing from FIG. 9.

FIGS. 9 and 10 are flowcharts of the algorithm for character input reception processing executed by the above-mentioned character input system 10. This algorithm is designed so that it can be applied regardless of which of the assigned character definition tables 100 is activated.

This algorithm is started in a state in which there are no character strings that have not been inputted to the application 2, such as immediately after the character input screen has been launched, or immediately after an input character string has been confirmed and outputted to the application 2. In the first step ST1, after various parameters (toggle counter, previous operation key, etc.) used for the reception of character input have been cleared, the flow proceeds to touch event detection processing by the operation detector 11 (step ST2).

If a touch is detected in step ST2, the answer in step ST3 becomes "Yes," and the operation detector 11 then determines where the touch point is (ST4). If the coordinates of the touch point are in on the inside of a specific character key 30, it is determined that a touch operation has been performed on that character key 30 ("Yes" in step ST5), and the processing from step ST6 onward is executed mainly by the character input reception component 17.

First, let us describe the processing that is common to both flick input operation and toggle input operation, that is, processing that is executed when a touch is detected for the first time at a specific character key 30 immediately after the clear processing of step ST1. In this case, whether or not there is a previous operation key (the character key operated the last time) is checked in step ST6 following step ST5, but the determination at this stage is "No" ("No" in step ST6), steps ST7 and ST8 are skipped, and steps ST9 to ST14 are executed.

In step ST9, the character input reception component 17 switches on the flick input mode. In the following step ST10, the character input reception component 17 reads definition information for the assigned characters during flick input operation and the representative character related to the character key 30 for which a touch was detected, from the activated assigned character definition table 100. The character input reception component 17 also selects the representative character as the input character in step ST11.

In step ST12, the flick input-use first guide image GF1 is produced and displayed by joint processing by the display controller 12 and the guide display component 14 on the basis of the information read in step ST10. The display location of the first guide image GF1 is adjusted on the basis of the location information for the character key 30 determined in step ST5 by the operation detector 11.

After this, the character key 30 for which a touch point has been detected is set as the previous operation key by the character input reception component 17 (step ST13), and the initial value on the toggle counter is set to zero (step ST14).

Processing for the touch ends in step ST14, the flow returns to step ST2, and the system waits for a new touch event, that is, for a change in the touch point after a touch. The flow of processing for the next touch event will be described in detail by distinguishing between when flick input operation is performed and when toggle input operation is performed.

Processing for Flick Input Operation

When flick input operation is performed, a slide operation is detected from movement of the touch point in step ST2 after the above-mentioned steps ST5 to ST14 have been executed in response to the detection of a touch on the character key 30. Upon receipt of this detection, step ST3 becomes "No," steps ST22 and ST23 in FIG. 10 become "Yes," and the flow proceeds to step ST24. In this step ST24, the character input reception component 17 selects the character corresponding to the detected slide direction on the basis of definition information during flick input read in response to the detection of the previous touch (the information read in step ST10). The second guide image GF2 indicating the selected character (see FIG. 5 (2)) is displayed as a result of joint processing by the display controller 12 and the guide display component 14 that have received this selection result (step ST25).

After this, if the flow returns to step ST2 and another touch is detected, step ST3 becomes "No," after which ST22 becomes "No," step ST26 becomes "Yes," and whether or not the mode is flick input mode is checked in step ST27. In this case, since the flick input mode, which was switched on in step ST9 immediately after the touch of the character key 30 was detected, is maintained, step ST27 becomes "Yes" and the flow proceeds to step ST28. In step ST28, joint processing by the display controller 12 and the input character string display component 15 results in the currently selected character, that is, the character selected in step ST24 in response to the detection of a slide operation, being displayed in the input character display area 4. In flick input mode, the input character is confirmed at this point, and the flow proceeds to step ST32.

In step ST32, the action of the candidate search component 18, the candidate display component 16, and the display controller 12 results in the display of the candidate display area 5 that shows the candidate in final form corresponding to the character displayed in step ST28. This ends the processing for one flick input operation.

To select the character corresponding to the slide direction of the flick input operation in step ST24, for example, the subsequent change in the coordinates of the touch point with respect to the touch detection point may be tracked, and a vector established that expresses this change. However, the slide direction can also be determined by the method shown in FIG. 11.

Figure 11:
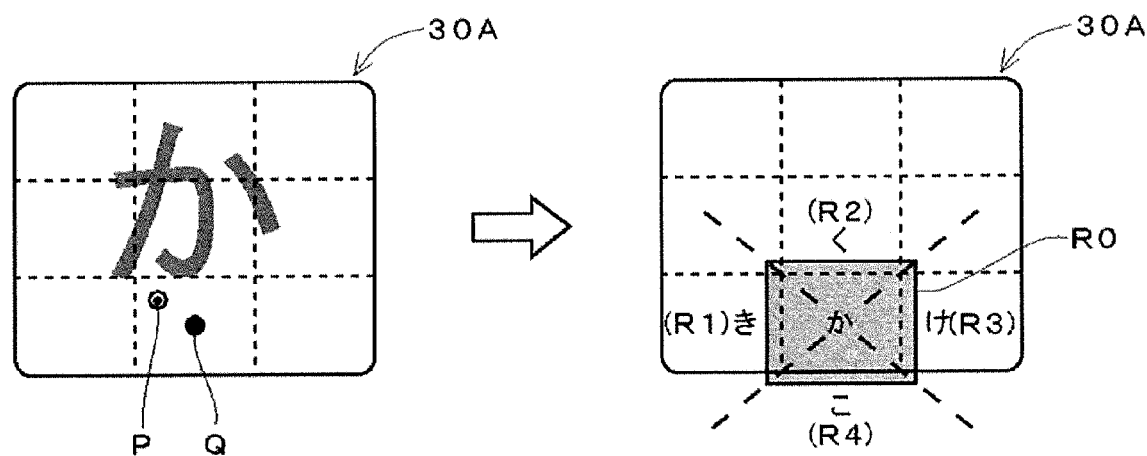
FIG. 11 is a diagram illustrating an example of the processing for determining the slide direction by flick input operation.

In the example in FIG. 11, as indicated by the dotted lines in the drawing, it is assumed that the character key 30A for which a touch has been detected is divided into a plurality of sub-areas, the sub-area that includes the touch detection point P is specified, and the determination region R0 for the representative character ("か" in the depicted example) is set by matching the center to the center point Q of this sub-area. The size of the determination region R0 is set to be slightly larger than one sub-area. Further, the periphery of the determination region R0 is divided in four by extensions of diagonals of the determination region R0, thereby creating determination regions R1, R2, R3, and R4 corresponding to the various directions (left, up, right, down) of the flick input operation. When the touch point after a touch goes from the determination region R0 to one of the other determination regions R1 to R4, the direction corresponding to the determination region that includes that touch point is established as the slide direction.

Processing for Toggle Input Operation

Let us return to the flowcharts in FIGS. 9 and 10. First we will describe the processing when the character key 30 is tapped once, without limiting ourselves to toggle input operation. For this first tap operation, a lift-up is detected in step ST2 after steps ST9 to ST14 have been executed in response to the detection of a touch on the character key 30 being operated. In response to this detection, step ST3 and step ST22 become "No," step ST26 becomes "Yes," the flow proceeds to step ST27, and it is determined whether or not the mode is flick input mode. At this point, since the flick input mode, which was switched on in step ST9 immediately when the first touch was detected, is maintained, step ST27 becomes "Yes." In response to this "Yes" determination, the flow proceeds to step ST28, and the selected character, that is, the representative character selected in step ST11 in response to the detection of the first touch, is displayed in the input character display area 4. After this, the flow proceeds to step ST32, candidate display is performed, and then the flow returns to step ST2.

In step ST2, if a second tap operation for inputting a character other than the representative character is detected, step ST3 and step ST5 become "Yes," and whether or not there is a previous operation key is checked in step ST6. At this point, since a previous operation key is held in step ST13 in response to the detection of the first touch, step ST6 becomes "Yes," and in step ST7, it is checked whether or not the character key 30 for which a touch was detected is the same one as the previous operation key. If step ST7 becomes "Yes," the flow proceeds to step ST15, and it is checked whether or not the mode is flick input mode.

If a second touch has been detected for the same character key 30 as the last time, both steps ST7 and ST15 become "Yes," the flow proceeds to step ST16, and the flick input mode is switched from on to off. The character input reception component 17 here reads the definition information for the assigned character during toggle input related to the character key 30 for which a touch was detected, from the active assigned character definition table 100 (step ST17). Once it has been confirmed that the toggle counter is not at its maximum value ("No" in step ST18), the toggle counter is incremented by 1 (step ST17). Consequently, the toggle counter is updated from "0" to "1."

In step ST21, joint processing by the display controller 12 and the guide display component 14 that have received the definition information read in step ST17 and the toggle counter updated as above results in the production of a toggle input-use guide image GT, which is displayed near the character key 30 being touched.

When the flow returns to step ST2 and a second lift-up is detected, step ST3 and step ST22 become "No," step ST26 becomes "Yes," step ST27 becomes "No," the flow proceeds to step ST29, and it is confirmed whether or not the value on the toggle counter is greater than zero. Since the toggle counter at this point is "1," step ST29 becomes "Yes," the flow proceeds to step ST30, and the character corresponding to the toggle counter is displayed instead of the representative character currently being displayed, on the basis of the definition information during toggle input read in the previous step ST17. In step ST32, the candidate display is also updated, and the flow returns to step ST2.

If after this a tap operation is continued on the same character key, processing proceeds in roughly the same flow as above for touch and lift-up each time. However, since the flick input mode will be off in the third and subsequent touches, step ST15 becomes "No," and steps ST16 and ST17 are skipped. The definition information for the assigned character during toggle input read in response to the detection of the second touch is also applied to the display of the character in step ST30 or the toggle input-use guide image GT displayed in step ST21.

After the number of tap operations has reached the maximum value indicated by the toggle input-use definition information (the number of assigned characters during toggle input), if a touch is detected on the same key as the previous operation key, step ST18 becomes "Yes" and the flow proceeds to step ST20. Since the flow proceeds to step ST21 after the toggle counter has been reset to zero in step ST20, in the guide image GT displayed in step ST21 the representative character located at the front of this image is highlighted in the display. For any touches detected after this, step ST26 becomes "Yes" and step ST27 becomes "No," after which step ST29 becomes "Yes," the flow proceeds to step ST31, and the representative character is again selected and displayed.

When the desired character has been displayed, if the user ends the toggle input operation and touches another character key 30, steps ST3, ST5, and ST6 become "Yes," after which step ST7 becomes "No," and the selected character, that is, the character displayed in the input character display area 4 in response to the last lift-up of the toggle input operation, is confirmed as the input character. After this, the processing from step ST9 and beyond is executed on any character key 30 for which a touch is newly detected. If a next touch is detected after the confirmation of the input character in response to flick input operation, step ST6 becomes "No," steps ST7 and ST8 are skipped, and the flow proceeds to step ST9.

If a slide operation is performed after the second or subsequent touch in toggle input operation, step ST21 after the "Yes" determination of step ST22 becomes "No," and the slide operation is invalidated. If a touch is detected somewhere other than the character key 30 at a specific point in time, step ST5 becomes "No," and the character input reception processing is ended.

The flow of processing when flick input operation and toggle input operation are performed on a character key 30 was described above, but processing can proceed by the same procedure as above for flick input operation or toggle input operation of the sub-character key 32.

The character input system 10 discussed above is not limited to a smart phone, and can also be introduced into the controller of various kinds of compact information processing device having a touch screen, such as a PDA, a remote control, or a wristwatch style portable terminal device. Also, the above-mentioned character input system 10 can be introduced into a large display device that requires that character input be received within a limited area of the touch screen so as not to impede the main information display.

INDUSTRIAL APPLICABILITY

With the present invention, the type of character to be inputted can be changed by executing either flick operation or toggle operation, without having to switch the keyboard image. Thus, character input work can be carried out more efficiently, which improves ease of operation and convenience.

REFERENCE SIGNS LIST 1 touch screen
2 application
3 keyboard image
4 input character display area
10 character input system
11 operation detector
12 display controller
13 keyboard display component
14 guide display component
15 input character string display component
17 character input reception component
19 confirmed character string output component
30 30A character key
100, 100A, 100B, 100C assigned character definition table
S smart phone

The invention claimed is:
1. A non-transitory computer readable medium, having stored thereon a program, the program comprising:
input screen setting instructions for setting on a touch screen an input character display area and a keyboard image including a plurality of character keys to which a plurality of characters are assigned;
character input reception instructions for executing
flick input reception processing in which one of a plurality of characters assigned to a touched character key is displayed in the input character display area as an input character in response to a flick input operation in which a touch is canceled after a touch position is slid in a specific direction while one of the character keys in the keyboard image is still being touched, and
toggle input reception processing in which the plurality of characters assigned to a character key are displayed one at a time in a specific order in the input character display area in response to a toggle input operation in which the same character key in the keyboard image is continuously tapped, and the character displayed at the end of the toggle input operation is confirmed as the input character; and
definition information registration instructions with which a plurality of character types are divided into a first group and a second group, and a plurality of characters are assigned to each of the plurality of character keys for each group, and in which are registered
flick input-use definition information that indicates, for each of the plurality of character keys, a correlation between the characters assigned to the character keys in one group and a direction of flick input operation pertaining to each character, and
toggle input-use definition information that indicates the plurality of characters assigned to the character keys in the other group, corresponding to a display order when these characters are displayed in the order of the toggle input operation, the character type of the second group being different from the character type of the first group, wherein,
in response to the flick input operation, the character input reception instructions determine the character corresponding to the direction of the flick input operation on the basis of the flick input-use definition information pertaining to the character key that is operated, and display the determined character in the input character display area, and,
in response to the toggle input operation, while the toggle input operation is being performed, the character input reception instructions switch the display of the character in the input character display area on the basis of the toggle input-use definition information pertaining to the character key that is operated; and
wherein, of the characters belonging to the character type of the first group, a number of characters corresponding to the number of character keys are assigned as representative characters for each character key in the keyboard image, and definition information for each character key includes information that establishes the display of representative characters according to the first tap of the relevant character key.
2. The non-transitory computer readable medium according to claim 1, wherein the first group includes just one particular character type and the second group includes the rest of the character types.
3. The non-transitory computer readable medium according to claim 1, wherein the definition information registration instructions include a first information group composed of the flick input-use definition information in which the assigned characters are characters of the first group and the toggle input-use definition information in which the assigned characters are characters of the second group, and a second information group composed of the toggle input-use definition information in which the assigned characters are characters of the first group and the flick input-use definition information in which the assigned characters are characters of the second group,
the program further comprising:
definition information activation instructions for receiving an operation to select whether input of characters of the character type in the first group is done by the flick input operation or by the toggle input operation, activating the first information group of the definition information registration instructions if the flick input operation is selected, and activating the second information group of the definition information registration instructions if the toggle input operation is selected.

4. A character input device, the character input device comprising:
- a controller configured to execute
  - input screen setting instructions for setting on a touch screen an input character display area and a keyboard image including a plurality of character keys to which a plurality of characters are assigned;
  - character input reception for executing
    - a flick input reception processing in which one of a plurality of characters assigned to a touched character key is displayed in the input character display area as an input character in response to a flick input operation in which a touch is canceled after a touch position has been slid in a specific direction while one of the character keys in the keyboard image is still being touched, and
    - a toggle input reception processing in which the plurality of characters assigned to a character key are displayed one at a time in a specific order in the input character display area in response to a toggle input operation in which the same character key in the keyboard image is continuously tapped, and the character displayed at the end of the toggle input operation is confirmed as the input character; and
  - definition information registration instructions that divide a plurality of character types into a first group and a second group, wherein a plurality of characters are assigned to each of the plurality of character keys for each group, and that register
    - flick input-use definition information that indicates, for each of the plurality of character keys, a correlation between the characters assigned to the character keys in one group and a direction of a flick input operation pertaining to each character, and
    - toggle input-use definition information that indicates the plurality of characters assigned to the character keys in the other group, corresponding to a display order when these characters are displayed in the order of the toggle input operation, the character type of the second group being different from the character type of the first group, wherein,
- in response to the flick input operation, the character input reception instructions determine the character corresponding to the direction of the flick input operation on the basis of the flick input-use definition information pertaining to the character key that was operated, and display the determined character in the input character display area, and,
- in response to the toggle input operation, while this toggle input operation is being performed, the character input reception instructions switch the display of the character in the input character display area on the basis of the toggle input-use definition information pertaining to the character key that is operated; and
- wherein, of the characters belonging to the character type of the first group, a number of characters corresponding to the number of character keys are assigned as representative characters for each character key in the keyboard image, and definition information for each character key includes information that establishes the display of representative characters according to the first tap of the relevant character key.

5. An information processing device comprising:
- a character input device including a controller configured to execute
  - input screen setting instructions for setting on a touch screen an input character display area and a keyboard image including a plurality of character keys to which a plurality of characters are assigned;
  - character input reception instructions for executing
    - a flick input reception processing in which one of a plurality of characters assigned to a touched character key is displayed in the input character display area as an input character in response to a flick input operation in which a touch is canceled after a touch position is slid in a specific direction while one of the character keys in the keyboard image is still being touched, and
    - a toggle input reception processing in which the plurality of characters assigned to a character key are displayed one at a time in a specific order in the input character display area in response to a toggle input operation in which the same character key in the keyboard image is continuously tapped, and the character displayed at the end of the toggle input operation is confirmed as the input character; and
  - definition information registration instructions that divide a plurality of character types into a first group and a second group, wherein a plurality of characters are assigned to each of the plurality of character keys for each group, and that register
    - flick input-use definition information that indicates, for each of the plurality of character keys, a correlation between the characters assigned to the character keys in one group and a direction of a flick input operation pertaining to each character, and
    - toggle input-use definition information that indicates the plurality of characters assigned to the character keys in the other group, corresponding to a display order when these characters are displayed in the order of the toggle input operation, the character type of the second group being different from the character type of the first group, wherein,
- in response to the flick input operation, the character input reception instructions determine the character corresponding to the direction of the flick input operation on the basis of the flick input-use definition information pertaining to the character key that is operated, and display the determined character in the input character display area, and,
- in response to the toggle input operation, while this toggle input operation is being performed, the character input reception instructions switch the display of the character in the input character display area on the basis of the toggle input-use definition information pertaining to the character key that is operated; and
- wherein, of the characters belonging to the character type of the first group, a number of characters corresponding to the number of character keys are assigned as representative characters for each character key in the keyboard image, and definition information for each character key includes information that establishes the display of representative characters according to the first tap of the relevant character key.

* * * * *